UNITED STATES PATENT OFFICE.

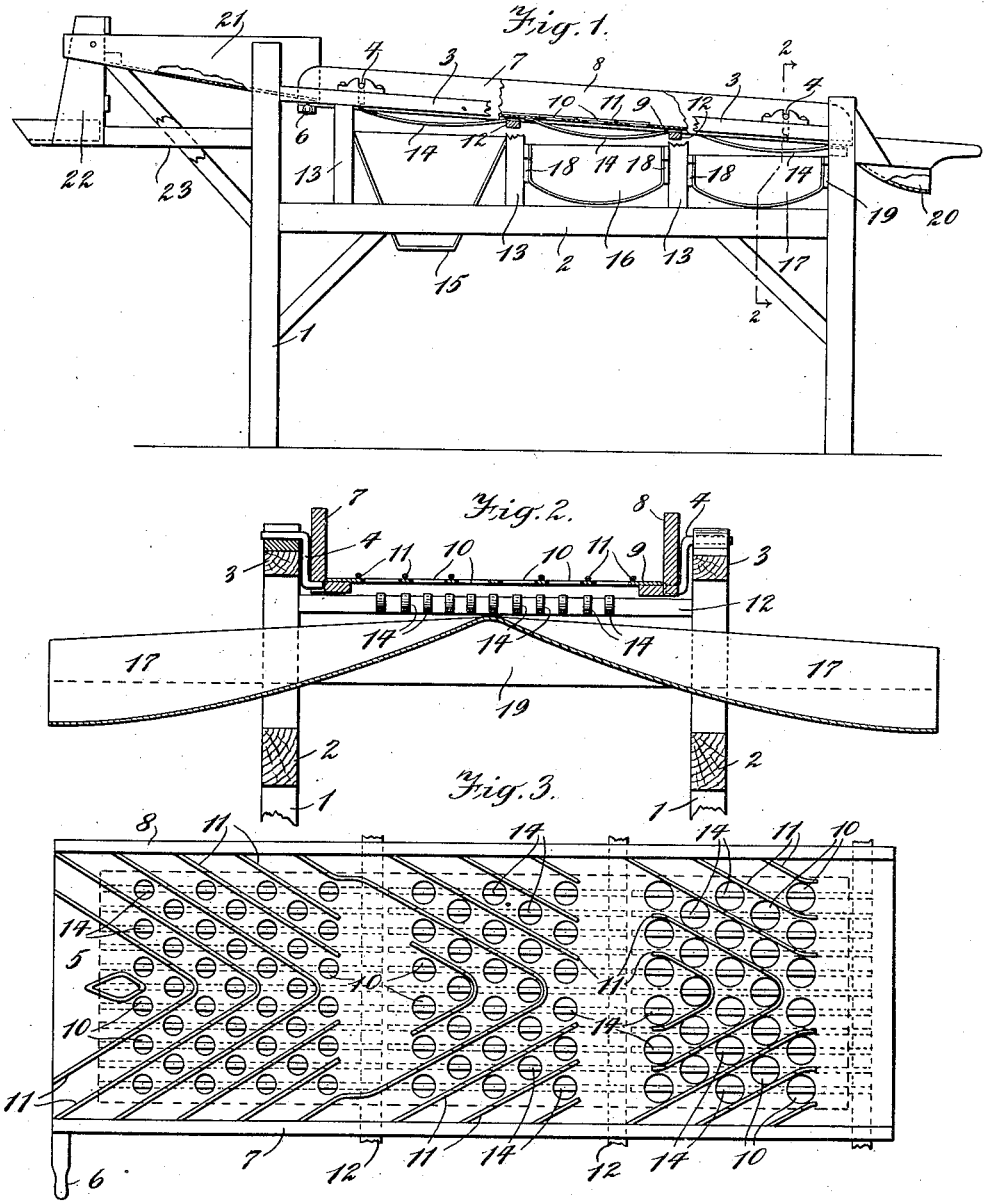

LAWRENCE WILLIAM SMITH AND DANIEL H. FRANCIS, OF GRAND JUNCTION, COLORADO.

FRUIT-GRADING MACHINE.

1,082,612.   Specification of Letters Patent.   Patented Dec. 30, 1913.

Application filed October 1, 1912. Serial No. 723,446.

*To all whom it may concern:*

Be it known that we, LAWRENCE WILLIAM SMITH and DANIEL H. FRANCIS, citizens of the United States, residing at Grand Junction, in the county of Mesa and State of Colorado, have invented a new and useful Improvement in Fruit-Grading Machines, of which the following is a specification.

This invention relates to improvements in fruit graders.

One of the objects of the invention is to provide a grading table or tray having a plurality of openings of graduated sizes through which the fruit is adapted to drop; the path of the travel of the fruit over the grading table being so determined with respect to the openings that the fruit will be discharged with greater certainty through the first opening of sufficient size to receive it.

Another object of the invention is to provide a fruit grader equipped with means for dislodging any fruit, without injuring or bruising it, which may obstruct an opening in the grading table or tray of insufficient size to permit the ready passage of the fruit through the opening.

Accordingly, the invention consists of a grading table the top surface of which is divided by a series of ridges into a plurality of separate paths or grooves, the openings in the grading table being formed in the middle of the grooves and arranged in rows over which the fruit travels in its passage over the table.

In addition to this, the invention consists of a plurality of flexible straps fastened to the under side of the table and to the supporting frame, the straps being so arranged that upon oscillation of the table in one direction they will be placed under tension and brought into engagement with the edges of the openings, whereby any fruit resting in the openings will be dislodged and permitted to pass on to an opening through which it may drop.

In the accompanying drawing, in which our improved form of fruit grader is illustrated, Figure 1 is a side elevation thereof; Fig. 2 is a section on the line 2—2 of Fig. 1; and Fig. 3 is a plan of the oscillating table.

A supporting frame comprising four legs or standards 1 are connected together by side and end cross-pieces 2, which are mortised to the standards in any well known manner. The upper ends of the standards are extended beyond the cross-pieces and have secured thereto the side rails 3 which slope gradually downwardly from the front to the rear end of the frame. Hangers 4 are rotatably mounted in each of the side rails near the ends thereof and suspend the tray 5 so that it may be oscillated by means of the handle 6. This tray comprises side boards 7 and 8 and a bottom 9. The bottom 9 preferably consists of canvas reinforced by leather and extends the full length of the tray. As illustrated, the bottom is divided into three sections, each section being provided with a group of circular openings 10 of the same size, the openings of the different sections being of graduated sizes, increasing in diameter from the front end toward the rear. Although we have shown but three sections, it is to be understood that a greater or less number may be provided, depending upon the use for which the grader is designed. The holes or openings in each of the groups are arranged in transverse and longitudinal rows, the openings in one row being in staggered relation and equidistant from those in the others. Cords or braided ropes 11 are sewed to the canvas surface, forming diagonal ridges to direct the fruit across the center of the holes and prevent the too rapid passage of the fruit along the tray. Connected to cross-bars 12 which are secured to the stanchions 13 carried by the side bars 2, are straps 14 made of canvas or some other fairly soft flexible material, which will not injure the fruit upon striking the same. These straps are so arranged beneath the table as to dislodge any fruit which may rest in an opening of insufficient size to allow it to drop through which would otherwise obstruct the uniform travel of the other fruit along the grading table. As shown, the straps are arranged under the longitudinal rows of holes and are attached to the under side of the tray at one end and at the other end to the cross-bars or braces 12 supported by the stanchions 13. The points of attachment of the straps to the bottom side of the table is so determined that when the table is oscillated, and is at one extreme position of its travel, these straps will be taut and will strike against the bottom edges of the opening, but when the table is in its other extreme position, the straps will be taut and will strike against the bottom edges of the opening, but when the table is in its other extreme position, the straps will be sufficiently slack to permit the fruit dropping through the holes to fall into the discharge chutes 15, 16 and 17.

Referring now to Fig. 2, wherein is shown a section of the discharge chute 17, it will be seen that the chute comprises supporting frames or boards 18 and 19, extending transversely across and beyond the side portions of the frame, being respectively attached to the rear standards 1 and to stanchions 12. Secured to these boards so as to be in close proximity to the underside of the table at its middle portion and gradually sloping downward toward each end, is the canvas discharge chute 17 which will catch the fruit dropping through the openings and guide it to the packing table (not shown). Extending from the rear end of the frame and below the end of the grading table is a discharge chute 20 which is adapted to catch that portion of the fruit which is not properly sorted. A preliminary or feeding chute 21 is attached to the front end of the frame and guides the fruit onto the tray. This chute is also preferably covered with canvas. A box supporting frame 22, comprising side and bottom pieces is pivotally secured to the sideboards of this chute and is adapted to receive the box of fruit to be sorted which, when swung into a horizontal position, will dump a portion of its contents onto the feeding chute. A stop 23 extends from one of the standards and is adapted to prevent the frame 18 from swinging when loaded.

What we claim as our invention is:

1. A fruit grader comprising a movable table having openings therein, means attached to the under side of said table for engaging with the bottom edges of said openings when said table is in one extreme position for dislodging the fruit obstructing said openings, and for permitting unobstructed passage of the fruit in the other extreme position.

2. A fruit grader comprising a movable table having openings therein, means located beneath the table for engaging with the bottom edges of said opening in one position of the table and spaced therefrom to permit unobstructed passage of the fruit through the openings in another position of the table, the movement of said means being controlled by the movement of the table.

3. A fruit grader comprising a frame, an oscillating grading table mounted thereon having a plurality of openings in said table, a plurality of flexible means secured at their ends to said frame and to the under side of the table respectively, said means arranged to engage with the bottom edges of said openings in one extreme position of said table and to be spaced therefrom a sufficient distance to permit an unobstructed passage of the fruit through the openings.

4. A fruit grader comprising a frame, an oscillating grading table mounted thereon having a plurality of openings in said table, a plurality of straps attached to said frame and to the under side of said table respectively, said straps being arranged to engage with the bottom edges of said openings when taut in one extreme position of said table and spaced therefrom to permit unobstructed passage through the openings in the other extreme position of the table.

5. A fruit grader comprising a frame, an oscillating table mounted thereon having a plurality of openings arranged in rows, a plurality of straps one for each row, said straps being connected to said frame and the under side of said table respectively, each strap being arranged to engage the bottom edges of the openings of a row in one extreme position of the table and permitting unobstructed passage through the openings in the other extreme position of the table.

6. A fruit grader comprising a grading table having a plurality of groups of openings of graduated sizes therein dividing the table into sections, a discharge chute arranged beneath each section, ridges on said table dividing the surface of the table into grooves, the openings being arranged in rows in the middle of said grooves for discharging with greater certainty a fruit of a certain size through the first opening of a proper size to permit its passage.

7. A fruit grader comprising a grading table having a plurality of groups of openings of graduated sizes therein dividing the table into sections, a discharge chute arranged beneath each section, a plurality of diagonally arranged ridges on the table dividing the surface of the table into grooves the openings in the table being arranged in rows in the middle of said grooves for discharging with greater certainty a fruit of a certain size through the first opening of the proper size to permit its passage.

L. WILLIAM SMITH.
DANIEL H. FRANCIS.

Witnesses:
SILAS L. KELLEY,
P. A. WELLS.

Copies of this patent may be obtained for five cents each, by addressing the "Commissioner of Patents, Washington, D. C."